United States Patent Office 3,506,603
Patented Apr. 14, 1970

3,506,603
WAXES
Irvin Baker and Charles Robins, Baltimore, Md., assignors to The Cello Chemical Company, Baltimore, Md., a corporation of Maryland
No Drawing. Filed Mar. 25, 1965, Ser. No. 442,822
Int. Cl. C09g 1/10
U.S. Cl. 260—28    16 Claims

ABSTRACT OF THE DISCLOSURE

This invention relates to waxes and the method of producing the same by reacting a reactive epoxy resin with a reactive wax.

---

The present invention relates to waxes, and more particularly to the reaction product of a wax and an epoxy resin and to the method of producing said reaction product. More specifically, the invention relates to the reaction product of a wax and an epoxy resin for use in bright drying floor polishes.

Aqueous emulsion bright drying polishes are generally prepared by blending dispersions of alkali soluble resins, waxes, and high polymers. The resins may be natural resins, such as rosin, terpene resins, or shellac, for example, or synthetic resins such as thermosetting terpene-phenolic resin, phenolaldehyde resins, or styrene-maleic anhydride resins, for example. The high polymers are generally emulsifiable addition type thermoplastic polymers, such as co-polymers of styrene and acrylic esters. The resins, waxes and high polymers are generally blended in a mixer to produce self-polishing aqueous liquids which will dry to a high gloss without buffing. Some of these polishes contain a relatively high amount of polymer and these polishes produce hard, glossy, non-buffable coatings which cannot be raised to a high gloss by buffing. On the other hand, the polishes which contain a relatively high amount of wax can be buffed to a high gloss although the initial gloss prior to buffing is not as high as that produced by a high polymer type of polish.

These self-polishing waxes and the methods of their preparation are well-known to the trade. The high polymers, as stated above, are prepared by polymerizing monomers such as styrene and acrylic esters in the presence of a catalyst in an aqueous medium to obtain a stable aqueous dispersion. The wax portion of the polish is prepared by blending one or more waxes with suitable emulsifiers and dispersing the mixture in hot water. The alkali soluble resins are dissolved in ammonia hydroxide and water with heat. The high polymer portion, the wax portion and the resin solution are blended together, together with other minor ingredients such as plasticizers. The wax portion is included in the polish to increase dirt resistance and to increase the buffability of the final coat.

The prime requirement of floor polishes is to obtain a protective coating for floor surfaces such as wood, tile, linoleum, etc., which will protect the surface against the heavy abrasion and wear resulting from foot traffic. The floor finishes are of such a nature that they must be considered as temporary protective coatings which are readily replaceable. The floors must be cleaned and recoated depending upon the size of traffic and quantity of contamination involved. In homes where traffic and contamination are relatively small, waxing approximately once a month will keep in the floors in excellent condition. In heavy industrial areas where foot traffic, dirt, sand and other contaminates are constantly being brought in and scraped across the floor, more frequent finishing is necessary, generally once a week or even more frequently. Permanent type finishes exist which have much greater abrasion resistance but would be classified as non-removable type of finish. The purpose of the emulsion floor coatings is to obtain a surface which has maximum durability consistent with ready removability. This enables the floor to be cleaned and returned to its original condition without difficulty. This requirement of removability has limited in the past the extent of durability obtainable with the aqueous floor polishes.

In accordance with the present invention, it has been found that the properties of the final polish are greatly improved by replacing at least some of the wax by the reaction product of a wax with a reactive epoxy resin. The inclusion of such a reaction product in the final polish improves the properties of the floor finish by increasing the abrasion resistance, initial unbuffed gloss, non-slip properties, rubber heel burn resistance, flexibility and stability, and also decreases the powdering tendency of the finsh. These improved qualities are obtained without adversely affecting the requirements of removability of the finish and without affecting the color of the finish.

Therefore, in acordance with one aspect of the present invention, there is provided the reaction product of a wax (synthetic or natural) and an epoxy resin. Another aspect of the invention is directed to the method of producing said reaction product. According to a still further aspect of the invention, there is provided a bright drying polish composition wherein at least a portion of the wax component is the reaction product of a wax and an epoxy resin.

Epoxy resins react with reactive hydrogens such as is present in alcoholic or acidic groups according to the following reactions:

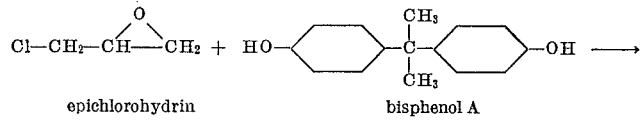

epichlorohydrin    bisphenol A

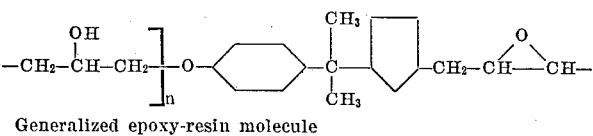

Generalized epoxy-resin molecule

The hydroxyl group [OH] and the epoxy group

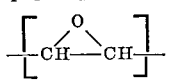

are reactive centers which react further under the influence of heat or catalysts with other reactive groups such as those found in natural waxes, oxidized waxes, natural and synthetic resins to form high molecular weight polymeric reaction products of greatly improved physical properties.

(1) 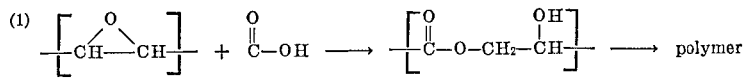 ⟶ polymer

The epoxide radical reacts with the carboxyl group (acidic) present in the above listed waxes and resins to form high molecular weight polymers.

(2) 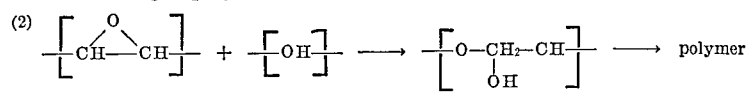 ⟶ polymer

The epoxide radical reacts with the hydroxyl group present in the above listed waxes and resins to form high molecular weight polymers.

The resultant reaction products further react to form polymers of extremely high molecular weight thus developing products of exceptional properties. Similar reactions occur between the hydroxyl groups in the epoxy radical and the reactive acidic and hydroxyl groups in the natural waxes and resins.

Because of the reactive groups present in waxes, reactive epoxies react with waxes to form polymeric products which are in the reaction products of the present invention.

EXAMPLE 1

Part A (Reaction product of wax and epoxy)

Reactant: Amount, pounds
Emulsifiable polyethylene (a synthetic wax) _ 715
Liquid epoxy resin (epoxide value 175–210) __ 10–80

The emulsifiable polyethylene is an oxidized polyethylene, such as sold under the trade name A–629 by the Semet-Solvay Petrochemical Division of Allied Chemical and Dye Corporation. The epoxy resin is a liquid epoxy with an epoxide value of 175–210 as exemplified by Shell's Epon 828 (reaction product of epichlorhydrin and Bisphenol A). The polyethylene is heated in a temperature range of 105–110° C. until molten. To the molten polyethylene in a closed container the epoxy resin is added drop-wise. The temperature is maintained for one-half hour with stirring. The product is the wax epoxy reaction product of the present invention.

Part B (Emulsification of wax epoxy reaction product)

Ingredients: Amount, pounds
Reaction product of Part A _____ 715
Oleic acid _____ 140
Morpholine _____ 140
Soft water _____ 5100

A mixture of Part A and oleic acid is heated to 100–110° C. until molten. The morpholine is added and the mixture is stirred for fifteen minutes while maintaining the temperature between 100–110° C. This mixture is then added to boiling soft water with rapid agitation. The mixture is cooled below 40° C. and stored. This product, an emulsion of the wax epoxy reaction product, is used to replace part or all the wax in a bright drying floor polish, the polish being formulated in the conventional manner.

EXAMPLE 2

Part A (Reaction product of wax and epoxy)

Reactant: Amount, pounds
Carnauba wax _____ 715
Epoxy resin (as in Example 1) _____ 20–400

Carnauba wax is heated to 90–100° C. The epoxy resin is added drop-wise to the heated wax in a closed container while stirring. Stirring is continued for one-half hour. The product is the reaction product of the wax and the epoxy resin.

Part B (Emulsification of wax epoxy reaction product)

Ingredients: Amount, pounds
Emulsifiable polyethylene (A–629) _____ 536½
Reaction product of Part A _____ 178½
Oleic acid _____ 140
Morpholine _____ 140
Soft water _____ 5100

*Procedure.*—Heat polyethylene, Part A, oleic acid to 100–110° C., and hold until melted. Add morpholine with stirring, hold 15 minutes, maintaining a temperature of 105–115° C. Add the mixture under rapid agitation to boiling soft water. Cool below 40° C. and store. The resultant product is used to replace part or all of the wax in a bright drying floor polish.

EXAMPLE 3

Part A (Reaction product of wax and epoxy resin)

Reactant: Amount, pounds
Oxidized microcrystalline paraffin wax ____ 715
Epoxy resin (as in Example 1) _____ 20–100

Heat microcrystalline wax to 95–105° C. Under stirring in closed container, add the epoxy resin carefully and slowly. Hold one-half hour with stirring. The resultant product is the wax epoxy resin reaction product.

Part B (Emulsification of wax epoxy resin reaction product)

Ingredients: Amount, pounds
Emulsifiable polyethylene (A–629) _____ 536½
Reaction product of Part A _____ 178½
Oleic acid _____ 140
Morpholine _____ 140
Soft water _____ 5100

Heat polyethylene, Part A, oleic acid to 105–115° C. Hold until waxes are melted. Under stirring add morpholine, hold for 15 minutes at 110–120° C. Under rapid agitation add mixture to boiling soft water. Cool below 30° C. and store. The resultant product is used to replace part or all of the wax in a bright drying floor polish.

EXAMPLE 4

The emulsion of the wax epoxy resin reaction product produced according to the previous examples may be used as the wax ingredient of a bright drying polish formulated in a conventional manner. An example of the range of formulations which can be used is as follows:

Percentages by weight
High polymer emulsion (15% non volatile) ____ 20–75
Resin solution (15% non volatile) _____ 15
Wax epoxy resin emulsion (Part B 15% non volatile) _____ 10–65
Plasticizer _____ 0–5

In the above formulation the volatile ingredient is water. Except for the wax epoxy resin emulsion, all of the ingredients are conventional ingredients used in bright drying polishes. The high polymer emulsion and the resin solution are as previously described. Tri-butoxy ethyl phosphate is an example of a plasticizer which may be used to increase the flexibility and to reduce powdering at low temperatures.

Use of the wax epoxy resin reaction products, also called "epoxidized waxes," in the polishes resulted in improved properties in proportion to the amount employed. In the proportions listed in the examples the following approximate improvements were found:

*Powdering.*—Use of epoxidized waxes increased flexibility and non-powdering conditions to such a degree that the quantity of plasticizer required was greatly reduced or eliminated depending on the quantity used.

Abrasion resistance was increased from 50 to 200% depending on the quantity of epoxidized waxes employed. This is to be expected as a result of the tremendous abrasion resistance of epoxy coatings as proven in the protective coatings field where these types of coatings were found to be far ahead of abrasion resistant coatings previously supplied. The increased abrasion resistance resulting from the use of epoxidized waxes increased rubber heel burn resistance from 50 to 200%. This is most important in floor finishes to prevent the formation of unsightly traffic marks.

Durability of the epoxidized product is increased to 50 to 200% depending on the quantity of epoxidized wax used. This follows directly as a result of the increased abrasion resistance.

Water resistance is greatly enhanced by the use of the epoxidized waxes. This is accomplished without loss of removability with alkaline cleaners which is a prerequisite of these types of finishes. The improved water resistance allows a greater number of damp mopping operations which are used to clean the floors in the interval between recoats with resultant increased life of the finish.

It has been found that the use of epoxidized waxes increased the stability and freeze-thaw resistance of the polishes. Stability was increased from six days at 125° F. to thirty days at 125° F. Freeze-thaw was increased from two cycles to six cycles of alternate freezing and thawing of the polish.

Any reactive epoxy resin can be reacted with the wax according to the present invention. Most preferably the epoxy resins are liquid epoxy resins having epoxide values in the range of about 170–275. Examples of epoxy resins are: Glycidyl ether-Bisphenol A; glycidyl ethers of glycerol; glycidyl ethers of Bisphenol F; and epoxylated novolacs. Many of the commercial reactive epoxy resins are glycidyl polyethers of polyhydric phenols made by reacting a polyhydric phenol with epihalohydrin. Due to the low cost and wider availability, the epoxy resins made from epichlorohydrin-Bisphenol A are generally used. Although the preferred epoxy resins are reactive liquid resins, reactive solid epoxy resins having higher epoxide equivalents can be used. The epoxy resins are well known commercial resins and it is not considered necessary to further describe these resins in detail. The epoxy resins are described in the book entitled "Epoxy Resins Their Applications and Technology," by Henry Lee and Kris Neville, McGraw-Hill Book Company, 1957. In chapter 1 of this book many epoxy resins are described and they are all useful according to the present invention. It is only necessary that the epoxy resin still be reactive (i.e., not cured) so that it will react with the reactive groups of the waxes.

The wax can be a natural or synthetic wax which is conventionally used in such polishes. The natural waxes include both vegetable waxes and mineral waxes such as oxidized paraffinic waxes. By way of example, there may be used oxidized micro crystalline paraffin wax, oxidized polyethylene, Fisher-Tropsch waxes, montan wax, carnauba wax, etc. All of these waxes are readily emulsifiable. It has further been found that by reacting the wax with epoxy resin, the quality of low cost waxes can be upgraded in their properties to the equivalent of the higher priced waxes, and the higher priced waxes can be upgraded still further.

The amount of epoxy resin which is reacted with the wax varies through a great range and it is generally of the order of about 1–60 parts by weight of epoxy resin to 100 parts of wax. The more highly saturated waxes such as oxidized paraffin or oxidized polyethylene will incorporate relatively small amounts of epoxy resin, whereas in the case of waxes such as vegetable waxes, a greater amount of epoxy resin can be incorporated. The wax is reacted with the epoxy resin until the reaction is substantially completed, i.e., until the amount of residual epoxy resin is less than about one-half percent. In general, the ratio of epoxy resin to wax is kept below the point where the reaction product has such a high melting point and molecular weight that the reaction product becomes difficultly dispersible to the fine particle size which is desirable in self-polishing waxes. The reaction products of the present invention are readily dispersible in water. In the above examples, Part B, oleic acid and morpholine act as dispersing agents for the reaction product.

When reacting the wax with the epoxy resin, the wax is heated to slightly above its melting point, to a temperature in the range of 90–120° C., the epoxy resin is added slowly while maintaining the temperature, and then the reaction mixture is maintained at about the same temperature until the reaction is completed. The reaction mixture is generally kept at a temperature between about 105–115° C.

Bisphenol A is bis(4-hydroxyphenyl)-2,2-propane and Bisphenol F is bis(4-hydroxyphenyl) methane.

We claim:

1. The heat reaction product of wax containing reactive groups selected from the group consisting of hydroxyl and carboxyl groups and a reactive epoxy resin, said reaction product being the reaction product of about 1–60 parts by weight of said epoxy resin per 100 parts of said wax reacted at a temperature between about 90–120° C. until the amount of residual epoxy resin is less than about ½%.

2. The heat reaction product of claim 1, wherein said epoxy resin is a glycidyl polyether of a polyalcohol.

3. The reaction product according to claim 2, wherein the epoxy resin is a reaction product of epichlorohydrin and bis(4-hydroxyphenyl)-2,2-propane having an epoxide equivalent range of about 175–275.

4. The heat reaction product of a reactive epoxy resin and a wax selected from the group consisting of oxidized paraffin wax, oxidized polyethylene, and vegetable waxes, said reaction product being the reaction product of about 1–60 parts by weight of said epoxy resin per 100 parts of said wax reacted at a temperature between about 90–120° C. until the amount of residual epoxy resin is less than about ½%, said epoxy resin being a glycidyl polyether of a polyalcohol.

5. The reaction product according to claim 4, wherein the wax is carnauba wax.

6. The reaction product according to claim 4, wherein the wax is emulsifiable oxidized polyethylene.

7. The reaction product according to claim 4, wherein the wax is oxidized microcrystalline wax.

8. The reaction product according to claim 4, wherein the epoxy resin is a glycidyl ether of bis(4-hydroxyphenyl)-2,2-propane.

9. The reaction product according to claim 4, wherein the epoxy resin is a glycidyl ether of glycerol.

10. The reaction product according to claim 4, wherein the epoxy resin is a glycidyl ether of bis(4-hydroxyphenyl) methane.

11. The reaction product according to claim 4, wherein the epoxy resin is an epoxylated novolac.

12. A bright drying polish composition containing a wax component comprising an aqueous emulsion of the heat reaction product of claim 2, said aqueous emulsion constituting about 10–65 parts by weight of the composition.

13. A process of producing a reaction product of wax and a reactive epoxy resin comprising heating about 100 parts by weight of the wax to a temperature between about 90–120° C., slowly adding about 1–60 parts by weight of a reactive epoxy resin to the molten wax in the absence of water, and maintaining the temperature until the amount of residual epoxy resin is less than about ½%, said wax containing reactive groups selected from the group consisting of hydroxyl and carboxyl groups, said epoxy being a glycidyl polyether of a polyalcohol.

14. A process according to claim 13, wherein said wax is selected from the group consisting of oxidized paraffin wax, oxidized polyethylene and vegetable waxes.

15. A process according to claim 14, wherein said epoxy resin is selected from the group consisting of glycidyl ether of bis(4-hydroxyphenyl)-2,2-propane, glycidyl ether of glycerol, glycidyl ether of bis(4-hydroxyphenyl) methane and epoxylated novolacs.

16. A bright drying polish composition according to claim 12, wherein said wax is selected from the group consisting of oxidized paraffin wax, oxidized polyethylene and vegetable waxes.

References Cited

UNITED STATES PATENTS

| | | | |
|---|---|---|---|
| 3,171,825 | 3/1965 | Mack | 260—28.5 |
| 3,227,668 | 1/1966 | Ackermann | 260—28 |

FOREIGN PATENTS 538,508  3/1957  Canada.

ALLAN LIEBERMAN, Primary Examiner

U.S. Cl. X.R.

260—836, 837